(12) United States Patent
Takahashi et al.

(10) Patent No.: US 9,094,498 B2
(45) Date of Patent: Jul. 28, 2015

(54) WATER RESISTANT STRUCTURE AND ELECTRONIC APPARATUS

(71) Applicant: FUJITSU LIMITED, Kawasaki-shi, Kanagawa (JP)

(72) Inventors: Jiro Takahashi, Kawasaki (JP); Tsukasa Goro, Kawasaki (JP); Tomonori Sakurai, Kawasaki (JP); Kazunobu Yoneyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/249,853

(22) Filed: Apr. 10, 2014

(65) Prior Publication Data

US 2014/0345899 A1 Nov. 27, 2014

(30) Foreign Application Priority Data

May 23, 2013 (JP) .................. 2013-109383

(51) Int. Cl.
*H05K 5/06* (2006.01)
*F16J 15/00* (2006.01)
*H04M 1/18* (2006.01)
*G06F 1/16* (2006.01)

(52) U.S. Cl.
CPC ............ *H04M 1/18* (2013.01); *G06F 1/1656* (2013.01)

(58) Field of Classification Search
CPC ............ G06F 1/1613; G06F 1/1656; H05K 5/06–5/069; F16J 15/06
USPC ............ 174/50, 50.5, 50.51, 520, 559, 560, 174/564; 361/679.01, 679.02, 679.09, 361/679.26, 679.3, 679.55, 679.56, 814; 455/575.1, 575.8; 277/590, 696, 626, 277/628; 220/378; 312/223.1
See application file for complete search history.

(56) References Cited

U.S. PATENT DOCUMENTS

| | | | |
|---|---|---|---|
| 7,854,434 B2 * | 12/2010 | Heiman et al. ................ 277/644 |
| 7,941,196 B2 * | 5/2011 | Kawasaki et al. .......... 455/575.8 |
| 8,520,373 B2 * | 8/2013 | Liu ........................... 361/679.03 |
| 8,792,249 B2 * | 7/2014 | Sasamori et al. ............. 361/801 |
| 8,891,237 B2 * | 11/2014 | Shinoda et al. .......... 361/679.56 |
| 2009/0111539 A1 | 4/2009 | Matsuda et al. |
| 2011/0199720 A1 * | 8/2011 | Kajiyama et al. ........ 361/679.01 |
| 2013/0242477 A1 * | 9/2013 | Hattori ..................... 361/679.01 |

FOREIGN PATENT DOCUMENTS

| | | |
|---|---|---|
| JP | 2006-033202 A | 2/2006 |
| JP | 2009-111720 A | 5/2009 |

* cited by examiner

*Primary Examiner* — Angel R Estrada
*Assistant Examiner* — Dimary Lopez Cruz
(74) *Attorney, Agent, or Firm* — Westerman, Hattori, Daniels & Adrian, LLP (57) ABSTRACT

A water resistant structure includes a first member having a stepped portion at an opening thereof; a second member having a rib protruding from a back surface thereof; and a water-stop member having an elastically deformable water-stop portion at a tip of a second plate portion that extends upward from a first plate portion. The first plate portion is attached to a horizontal surface of the stepped portion by double-sided adhesive tape. The second plate portion faces a vertical surface of the stepped portion. The water-stop portion is spread along the vertical surface of the stepped portion. The rib is pressed into an inner side of the water-stop portion, and the water-stop portion is pushed against the vertical surface of the stepped portion and the rib.

8 Claims, 7 Drawing Sheets

WATER RESISTANT STRUCTURE AND ELECTRONIC APPARATUS

CROSS REFERENCE TO RELATED APPLICATIONS

This application is based upon and claims the benefit of priority of the prior Japanese Patent Application No. 2013-109383, filed on May 23, 2013, the entire contents of which are incorporated herein by reference.

FIELD

The embodiments discussed herein are related to a water resistant structure and an electronic apparatus.

BACKGROUND

According to a conventional water resistant structure for an electronic apparatus, packing that wraps one cover on an outer surface of the cover is sandwiched by the outer surface and an inner surface of another cover that faces the outer surface (see, e.g., Japanese Laid-Open Patent Publication No. 2006-33202). According to another water resistant structure, an O-ring attached to an outer surface of a protrusion protruding from a back surface of a lid covering an opening is caused to be in contact with an inner surface of the opening (see, e.g., Japanese Laid-Open Patent Publication No. 2009-111720).

Nonetheless, since the shape and the appearance of the lid differ according to the model of the electronic apparatus, a problem arises in that a mold needs to be newly produced for each model even when the back surface of the lid such as a protrusion has the same shape for each of the models. When an O-ring is attached to the outer surface of the protrusion, the O-ring tends to be twisted and the O-ring needs to be reattached. Therefore, the first time quality may drop.

SUMMARY

According to an aspect of an embodiment, a water resistant structure includes a first member having a stepped portion at an opening thereof; a second member having a rib protruding from a back surface thereof; and a water-stop member having an elastically deformable water-stop portion at a tip of a second plate portion that extends upward from a first plate portion. The first plate portion is attached to a horizontal surface of the stepped portion by double-sided adhesive tape. The second plate portion faces a vertical surface of the stepped portion. The water-stop portion runs along the vertical surface of the stepped portion. The rib is pressed into an inner side of the water-stop portion, and the water-stop portion is pushed against the vertical surface of the stepped portion and the rib.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of a water resistant structure and an electronic apparatus will be described in detail with reference to the accompanying drawings. Components that are the same are given the same reference numerals in the embodiments and redundant description is omitted.

Figure 1:
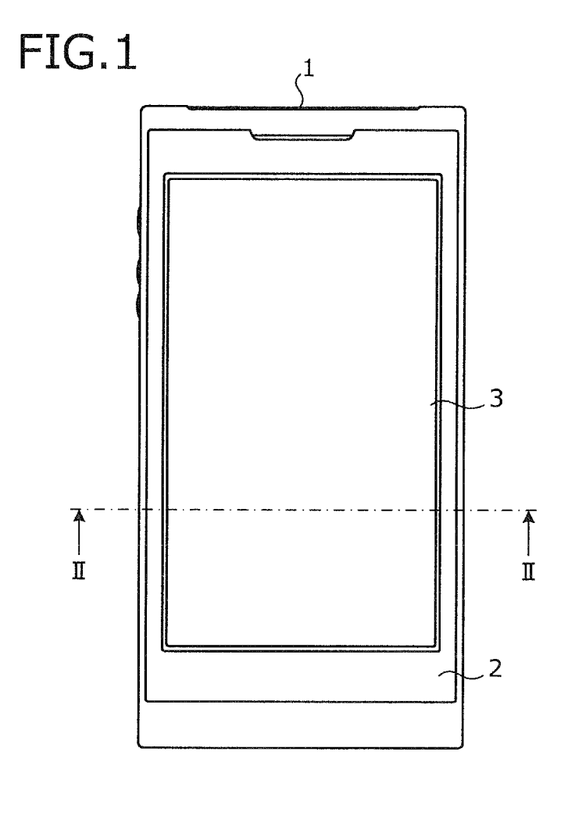
FIG. 1 is a front view of an example of an electronic apparatus of an embodiment.
Figure 2:
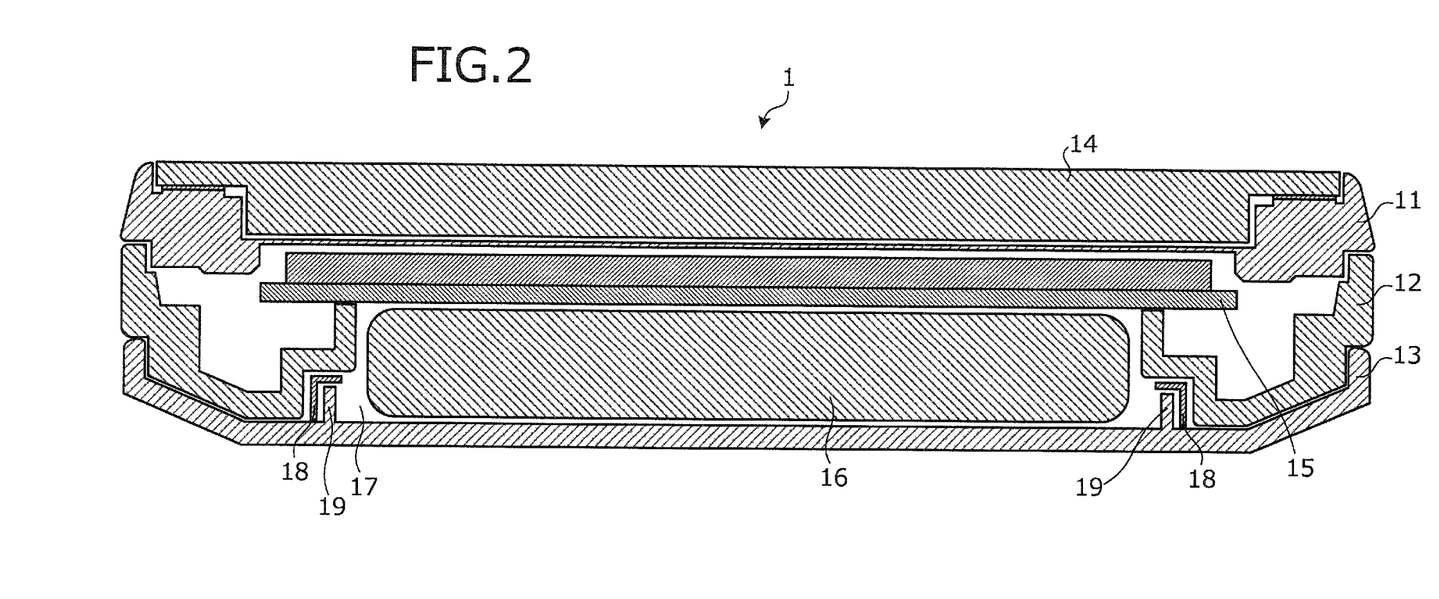
FIG. 2 is a cross-sectional view taken at a line II-II in FIG. 1.
Figure 3:
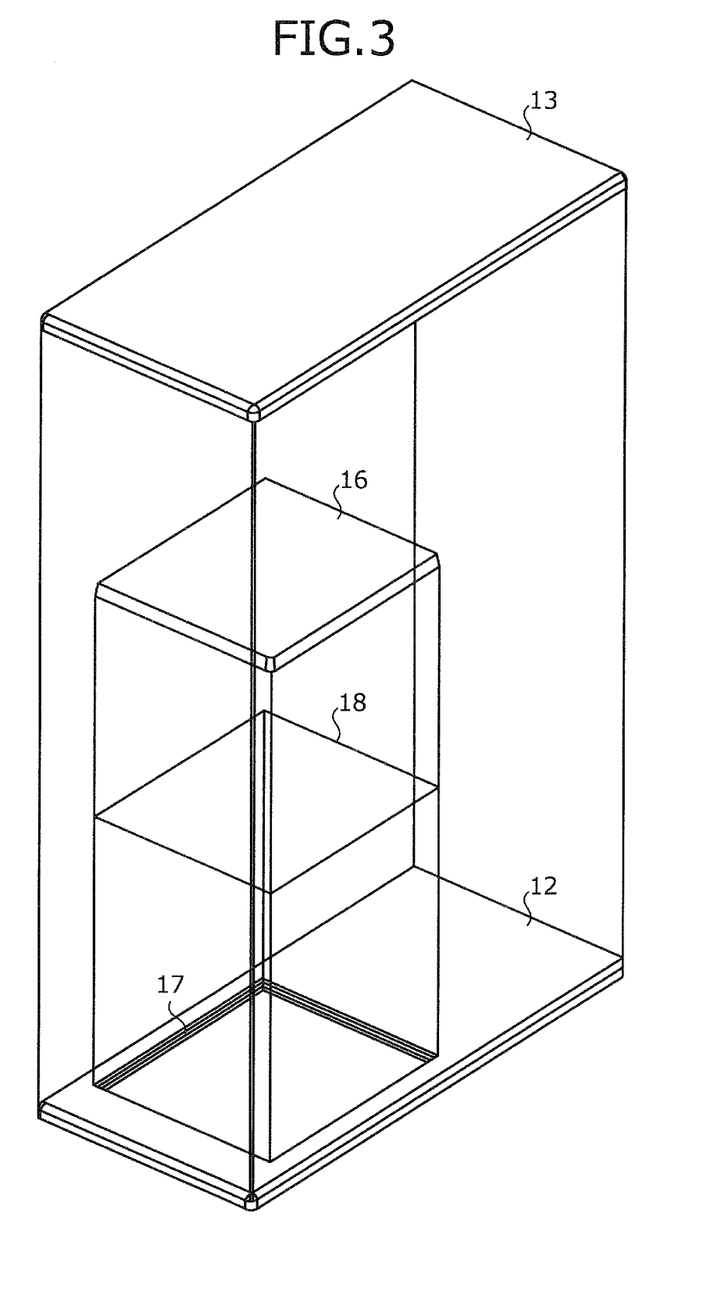
FIG. 3 is an exploded perspective view of the electronic apparatus depicted in FIG. 1.
Figure 4:
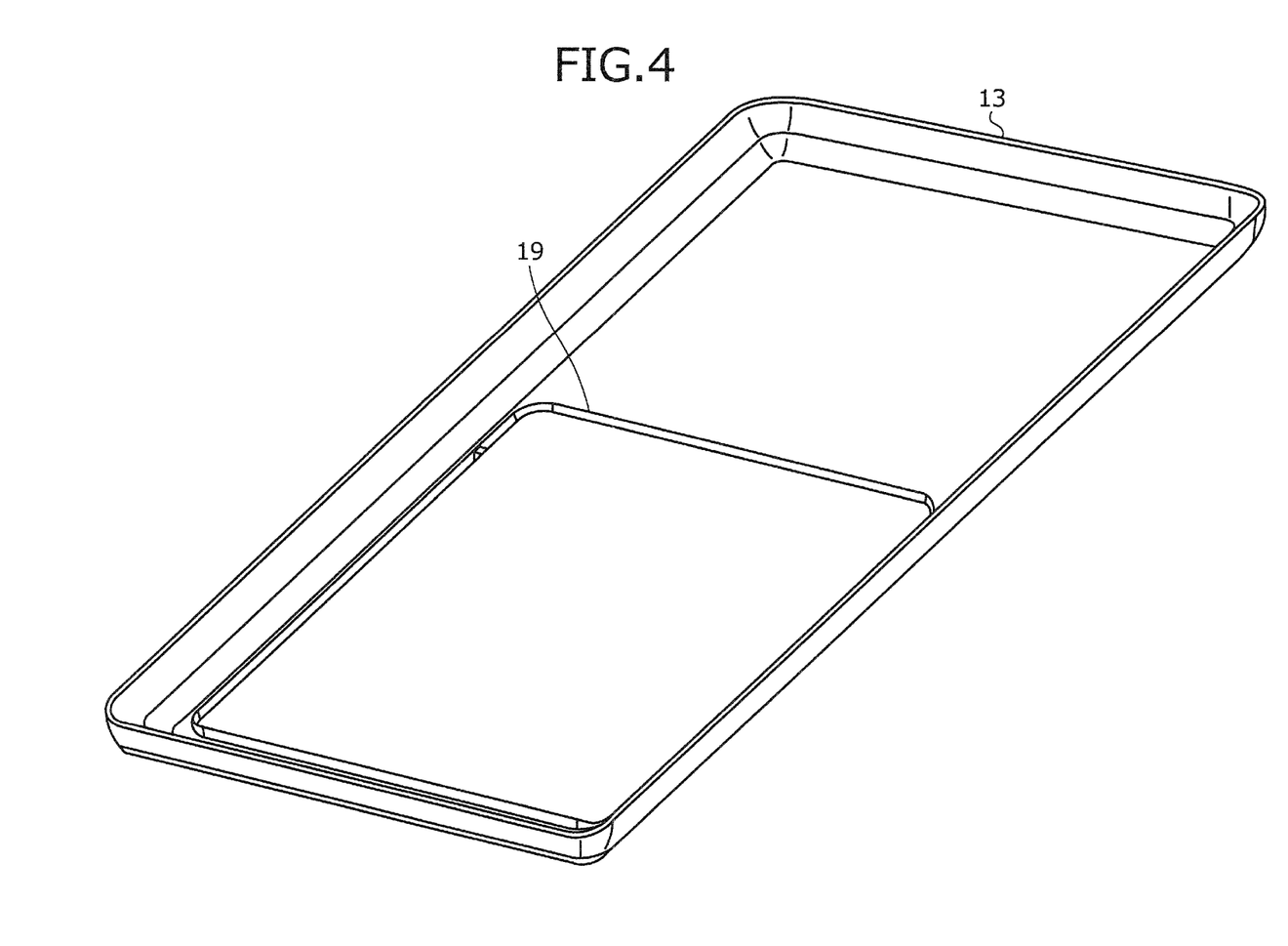
FIG. 4 is a perspective view of a back surface of a rear cover of the electronic apparatus depicted in FIG. 1.

FIGS. 1, 2, 3 and 4 are diagrams of an example of an electronic apparatus according to an embodiment. FIG. 1 is a front view of the electronic apparatus. FIG. 2 is a cross-sectional view taken at a line II-II in FIG. 1. FIG. 3 is an exploded perspective view of the electronic apparatus depicted in FIG. 1. FIG. 4 is a perspective view of a back surface of a rear cover of the electronic apparatus depicted in FIG. 1.

As depicted in FIG. 1, the electronic apparatus 1 may include, for example, a display panel 2 on the front surface thereof. The display panel 2 includes a display window unit 3 to display characters and designs. In the display window unit 3, for example, a touch panel may be integrated in a liquid crystal panel.

The electronic apparatus 1 may be, for example, a mobile communication terminal such as a mobile telephone or a smartphone, or may be a portable music player, a portable game console, etc. The electronic apparatus 1 is not limited to a portable electronic apparatus. In this example, the description will be made assuming that the electronic apparatus 1 is a smartphone.

As depicted in FIG. 2, the electronic apparatus 1 may have a front case 11, a rear case 12, a rear cover 13, a display module 14, a substrate 15, and a battery 16. A housing of the electronic apparatus 1 is formed by assembling the front and the rear cases 11 and 12. For example, packing is embedded in a gap between the front and the rear cases 11 and 12 and thereby, entrance of water and dust is prevented. The rear case 12 is an example of a first member. The rear cover 13 is an example of a second member.

The display module 14 includes, for example, a display panel 2. The display module 14 may be fixed to the front case 11 by, for example, double-sided adhesive tape. The substrate 15 and the battery 16 are accommodated in a space formed by the front and the rear cases 11 and 12. The rear cover 13 is laid on the rear case 12 and closes an opening of a battery accommodation space 17. The gap between the rear cover 13 and the rear case 12 is blocked by, for example, a water resistant structure described later and thereby, the entrance of water and dust is prevented.

As depicted in FIG. 3, for example, an annular water-stop member 18 is attached to the edge of the opening of the battery accommodation space 17 of the rear case 12. The water-stop member 18 has an elastically deformable water-stop portion. The water-stop member 18 will be described in detail hereinafter in the description of the water resistant structure.

On the other hand, as depicted in FIG. 4, the rear cover 13 includes a rib 19 on a face facing the rear case 12 and the battery accommodation space 17, that is, the back surface of the rear cover 13. The rib 19 protrudes, for example, in an annular-shape from the back surface of the rear cover 13. When the rear cover 13 is laid over the rear case 12, the gap between the rear cover 13 and the rear case 12 is blocked by the water resistant structure described later that includes the water-stop member 18 and the rib 19.

Figure 5:
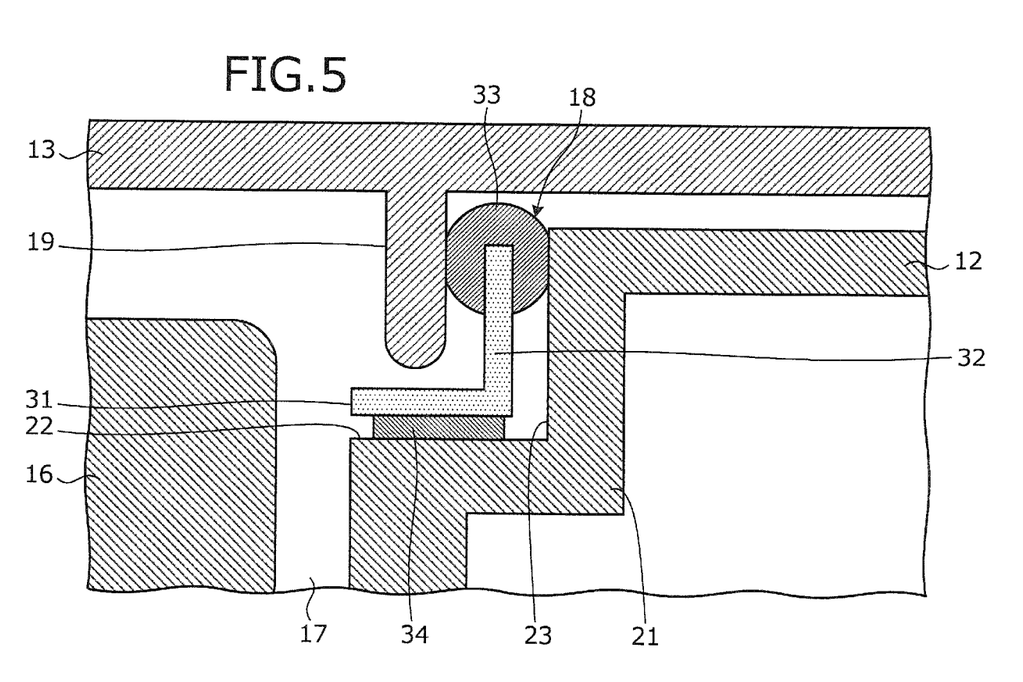
FIG. 5 is a diagram of a first example of a water resistant structure according to the embodiment.

FIG. 5 is a diagram of a first example of the water resistant structure according to the embodiment. In FIG. 5, the water-stop member 18, the rib 19, and the surrounding portions thereof are depicted inverted with respect to the orientation depicted in FIG. 2.

As depicted in FIG. 5, the rear case 12 includes a stepped portion 21 in the opening of the battery accommodation space 17. For the stepped portion 21, an aspect perpendicular to a dimension of thickness of the electronic apparatus 1 (in FIG. 5, the vertical dimension) will be referred to as "horizontal surface", and an aspect perpendicular to this horizontal surface will be referred to as "vertical surface". Therefore, in FIG. 5, a reference numeral "22" denotes the horizontal surface of the stepped portion 21 and a reference numeral "23" denotes the vertical surface of the stepped portion 21.

The water-stop member 18 may include, for example, a first plate portion 31, a second plate portion 32, and a water-stop portion 33. The second plate portion 32 extends upward from the first plate portion 31. The first and the second plate portions 31 and 32 may integrally be molded, or may be molded separately from each other and integrally combined with each other.

The water-stop portion 33 is disposed at the tip of the second plate portion 32, and may be formed by a material that is elastically deformable as its property. For example, the water-stop portion 33 may be formed by an elastomer. In the example depicted in FIG. 5, the cross-sectional shape of the water-stop portion 33 is a circle. However, the cross-sectional shape is not limited hereto and may take any among various shapes such as an ellipse, an elongated circle, a triangle, and a rectangle.

The water-stop member 18 is formed into an annular shape of a size by which the water-stop portion 33 is in contact with the vertical surface 23 of the stepped portion 21 of the rear case 12. The first plate portion 31 of the water-stop member 18 is fixed to the horizontal surface 22 of the stepped portion 21 in the state such that the second plate portion 32 faces the vertical surface 23 of the stepped portion 21 of the rear case 12. The first plate portion 31 of the water-stop member 18 may be attached to the horizontal surface 22 of the stepped portion 21 by, for example, a double-sided adhesive tape 34. The attachment of the water-stop member 18 to the stepped portion 21 of the rear case 12 causes the water-stop portion 33 to run along the vertical surface 23 of the stepped portion 21.

When the rear cover 13 is laid over the rear case 12, the rib 19 protruding from the back surface of the rear cover 13 is pressed against the water-stop portion 33 that runs along an opening of the rear case 12, forming the battery accommodation space 17. Thus, the water-stop portion 33 is crushed and deformed between the rib 19 and the vertical surface 23 of the stepped portion 21 of the rear case 12, whereby the water-stop portion 33 is caused to be tightly in contact with the rib 19 and the vertical surface 23 of the stepped portion 21. The water-stop portion 33 is pushed against the rib 19 and the vertical surface 23 of the stepped portion 21 by a restorative force exerted as the crushed water-stop portion 33 attempts to return to the original shape thereof, whereby the water resistant property is maintained with respect to the gap between the rear cover 13 and the rear case 12.

With the water resistant structure depicted in FIG. 5 or the electronic apparatus 1 that includes the water resistant structure depicted in FIG. 5, the thickness of the rib 19 of the rear cover 13 can be adjusted, thereby enabling adjustment of the degree to which the water-stop portion 33 is crushed when the rib 19 is pressed against the water-stop portion 33. Therefore, no change in the dimensions or the shape of the water-stop member 18 according to model is necessary to achieve the degree of crush optimal for each of the models. Thus, even when models differ, if the size of the opening of the rear case 12 is same, a water-stop member 18 of the same dimensions and the same shape can be used as is for each of the models, i.e., the water-stop member 18 can be standardized among the different models.

With the water resistant structure depicted in FIG. 5 or the electronic apparatus 1 that includes the water resistant structure depicted in FIG. 5, the water-stop member 18 is formed in a size to just fit in the opening of the rear case 12 and therefore, the attachment position of the water-stop member 18 is naturally adjusted by merely inserting the water-stop member 18 into the opening of the rear case 12. Since rib 19 is pressed into the water-stop portion 33, whereby a force acts on the water-stop member 18, pushing the water-stop member 18 against the horizontal surface 22 of the stepped portion 21 of the rear case 12, the first plate portion 31 of the water-stop member 18 is attached to the horizontal surface 22 of the stepped portion 21 by the double-sided adhesive tape 34. As a result, excellent fabricability is achieved and no O-ring attachment work is necessary. Accordingly, the first time quality can be improved.

In a case where an attachment portion for an O-ring is disposed on the back surface of the rear cover as with a conventional water resistant structure, the thickness of the rear cover has to be increased to prevent warpage of the front surface of the rear cover when the rear cover is molded. In contrast, with the water resistant structure depicted in FIG. 5 or the electronic apparatus 1 that includes the water resistant structure depicted in FIG. 5, no O-ring is attached to the rib 19 and therefore, the amount of the protrusion of the rib 19 from the back surface of the rear cover 13 can be reduced compared to that for the attachment portion for the O-ring. The smaller the amount of the protrusion of the rib 19 is, the more difficult it is for warpage of the front surface of the rear cover 13 to occur and therefore, the rear cover 13 can be formed to be thinner than that in a case where an attachment portion for the O-ring is disposed. Accordingly, reduction of the thickness of the electronic apparatus 1 can be facilitated.

With the water resistant structure depicted in FIG. 5 or the electronic apparatus 1 that includes the water resistant structure depicted in FIG. 5, no water-stopping component such as the water-stop member 18 needs to be attached to the rear cover 13 and therefore, the rear cover 13 is completely formed only by molding the rear cover 13 using, for example, injection molding. Therefore, the time period necessary for manufacturing the rear cover 13 and the yield thereof become substantially equivalent to those of ordinary single molded parts and the quality of the rear cover 13 is improved.

In the water resistant structure depicted in FIG. 5, the first and the second plate portions 31 and 32, and the water-stop portion 33 of the water-stop member 18 may be molded integrally with each other by, for example, insert molding. Molding the portions accordingly, the first and the second plate portions 31 and 32 do not need to be produced separately and then combined with each other, and the water-stop portion 33 does not need to be attached to the tip of the second plate portion 32. Therefore, the labor and the time necessary for the manufacture of the water-stop member 18 can be reduced and the quality of the water-stop member 18 is improved.

In the water resistant structure depicted in FIG. 5, the first and the second plate portions 31 and 32 of the water-stop member 18 may be formed of metal. Forming the portions accordingly, a sufficient strength can be achieved for the portions even when the portions are thin and therefore, the first and the second plate portions 31 and 32 can be formed to be thin. Therefore, the water-stop member 18 can be reduced in size, enabling reduction of the thickness of the electronic apparatus 1 to be facilitated. The material of the first and the second plate portions 31 and 32 is not limited to a metal and merely has to be, for example, a material harder than elastomer. For example, polyethylene-terephthalate is an example of a material harder than elastomer. Even when the corners of the opening of the rear case 12 each have a curved shape, the first and the second plate portions 31 and 32 can easily be formed to match the curved shape by using a material of high formability such as polyethylene-terephthalate.

In the water resistant structure depicted in FIG. 5, the second plate portion 32 of the water resistant member 18 may have a spring property and may be elastically deformed causing the rib 19 to be pressed by the water-stop portion 33. In this case, the force caused by the restorative force generated by the second plate portion 32 and pushing the water-stop portion 33 against the rib 19 can be adjusted by adjusting the shape of the rib 19 of the rear cover 13. Therefore, overall contact pressures can be stabilized, such as that between the water-stop portion 33 and the rib 19 and that between the water-stop portion 33 and the vertical surface 23 of the stepped portion 21 of the rear case 12.

Figure 6:
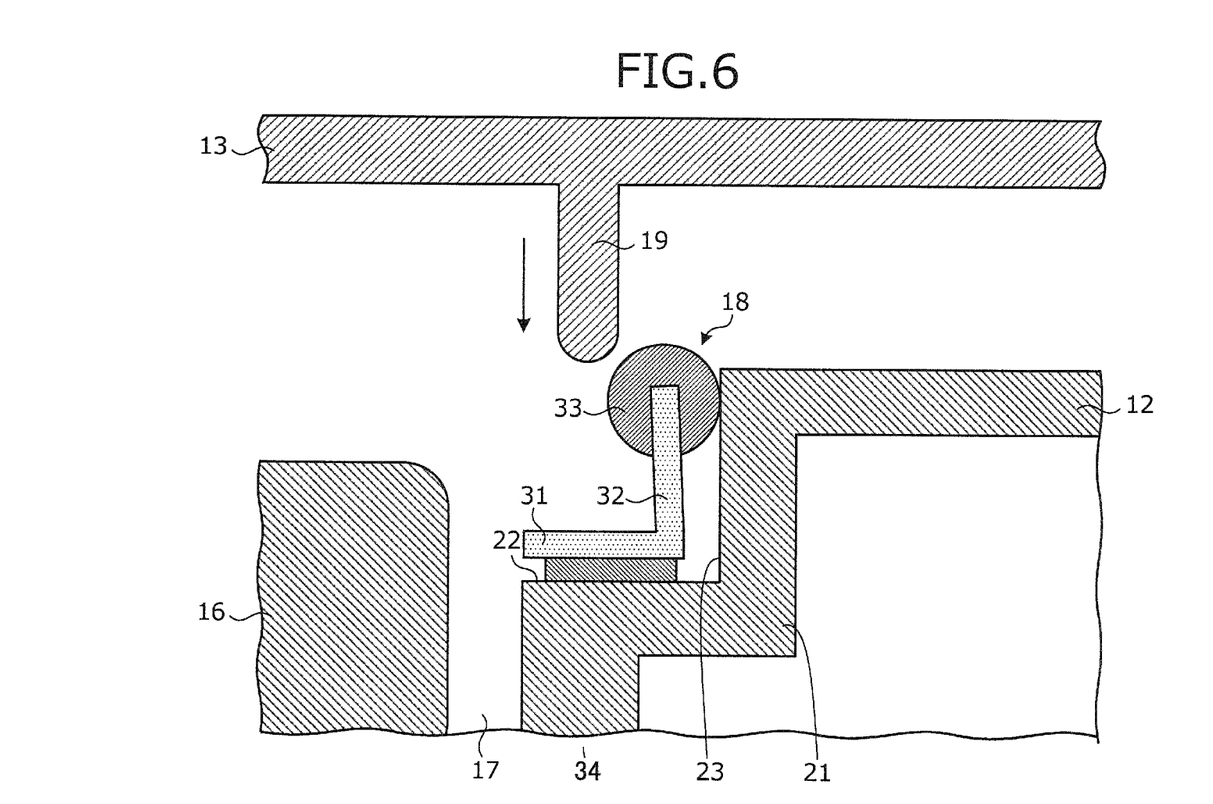
FIG. 6 is a diagram of a second example of the water resistant structure according to the embodiment.

FIG. 6 is a diagram of a second example of the water resistant structure according to the embodiment. FIG. 6 depicts the state before the rear cover 13 is laid over the rear case 12. In FIG. 6, the water-stop member 18, the rib 19, and the surrounding portions thereof are depicted inverted with respect to the orientation depicted in FIG. 2.

As depicted in FIG. 6, in the second example, the second plate portion 32 of the water-stop member 18 has a spring property. The second plate portion 32 may be gradually inclined away from the vertical surface 23 of the stepped portion 21 of the rear case 12, starting from a border portion with the first plate portion 31 toward the water-stop portion 33 at the tip.

When the rib 19 is pressed into an inner side of the water-stop portion 33, the second plate portion 32 is elastically deformed to push the water-stop portion 33 against the vertical surface 23 of the stepped portion 21. Thereby, a restorative force is exerted by the second plate portion 32 to return the second plate portion 32 to the inclined state before the rib 19 was pressed into the inner side of the water-stop portion 33. The restorative force pushes the water-stop portion 33 against the rib 19. The other configurations are same as those of the first example depicted in FIG. 5 and will not again be described.

With the water resistant structure depicted in FIG. 6 or the electronic apparatus 1 that includes the water resistant structure depicted in FIG. 6, restorative forces are exerted as such that for the crushed water-stop portion 33 to return its original state, and that for the elastically deformed second plate portion 32 to return to its original state. These two restorative forces act together and thereby, the rear cover 13 can be more securely attached to the rear case 12. The user can more clearly feel the attachment of the rear cover 13 to the rear case 12 when the user places the rear cover 13 on the rear case 12.

Figure 7:
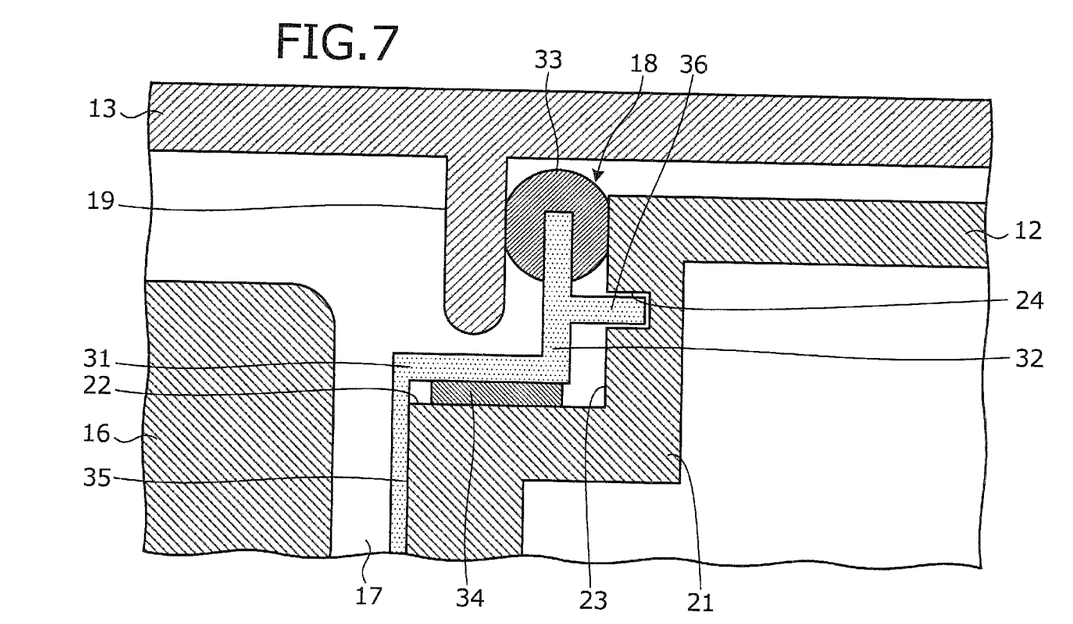
FIG. 7 is a diagram of a third example of the water resistant structure according to the embodiment.

FIG. 7 is a diagram of a third example of the water resistant structure according to the embodiment. In FIG. 7, the water-stop member 18, the rib 19, and the surrounding portions thereof are depicted inverted with respect to the orientation depicted in FIG. 2.

As depicted in FIG. 7, in the third example, for example, the first plate portion 31 of the water-stop member 18 may be formed by a conductive material such as a metal and may be electrically connected to the ground of the electronic apparatus 1. For example, the water-stop member 18 may include a wire 35 running along the rear case 12 from an end of the first plate portion 31. The wire 35 may be connected to, for example, a ground terminal of the substrate 15 or a metal plate portion positioned on the back side of the display module 14 of the front case 11.

In the third example, a protrusion 36 extending toward the vertical surface 23 of the stepped portion 21 may be disposed on the second plate portion 32 of the water-stop member 18 and a recess 24 may be disposed in the vertical surface 23 of the stepped portion 21 at a position corresponding to the protrusion 36. The end of the protrusion 36 of the second plate portion 32 may be inserted into the recess 24 of the vertical surface 23 of the stepped portion 21. Other configurations are same as those of the first example depicted in FIG. 5 and will not again be described.

With the water resistant structure depicted in FIG. 7 or the electronic apparatus 1 that includes the water resistant structure depicted in FIG. 7, the first plate portion 31 of the water-stop member 18 is connected to the ground and therefore, static electricity that externally encroaches the electronic apparatus 1 can be reduced. The protrusion 36 of the second plate portion 32 is inserted into the recess 24 of the vertical surface 23 of the stepped portion 21 and therefore, stripping of the double-sided adhesive tape 34 can be prevented, the stripping being consequent to dragging of the water-stop portion 33 by the rib 19 due to the frictional force generated when the rib 19 is pressed into the inner side of the water-stop portion 33 or when the rear cover 13 is detached.

In the second example of the water resistant structure, the first plate portion 31 of the water-stop member 18 may be connected to the ground. Further, a protrusion may be disposed on the second plate portion 32 of the water-stop member 18; a recess may be disposed in the vertical surface 23 of the stepped portion 21; and the end of the protrusion may be inserted into the recess.

According to the water resistant structure and the electronic apparatus, a water-stopping component to ensure water resistance can be standardized among different models. The first time quality of the fabrication can be improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A water resistant structure comprising:
   a first member having a stepped portion at an opening thereof;
   a second member having a rib protruding from a back surface thereof; and a water-stop member having an elastically deformable water-stop portion at a tip of a second plate portion that extends upward from a first plate portion, wherein the first plate portion is attached to a horizontal surface of the stepped portion by double-sided adhesive tape, the second plate portion faces a vertical surface of the stepped portion, the water-stop portion runs along the vertical surface of the stepped portion, the rib is pressed into an inner side of the water-stop portion, and the water-stop portion is pushed against the vertical surface of the stepped portion and the rib.

2. The water resistant structure according to claim 1, wherein the second plate portion of the water-stop member has a spring property, and is caused to push the water-stop portion against the rib by a restorative force exerted by the second plate portion consequent to elastic deformation of the second plate portion, pushing the water-stop portion against the vertical surface of the stepped portion due to pressing of the rib into the inner side of the water-stop portion.

3. The water resistant structure according to claim 1, wherein the water-stop member is connected to a ground.

4. The water resistant structure according to claim 1, wherein the water-stop member comprises a protrusion extending toward the vertical surface of the stepped portion, a recess is disposed in the vertical surface of the stepped portion, and an end of the protrusion is inserted into the recess.

5. An electronic device comprising a water resistant structure comprising:

a first member having a stepped portion at an opening thereof;

a second member having a rib protruding from a back surface thereof; and a water-stop member having an elastically deformable water-stop portion at a tip of a second plate portion that extends upward from a first plate portion, wherein the first plate portion is attached to a horizontal surface of the stepped portion by double-sided adhesive tape, the second plate portion faces a vertical surface of the stepped portion, the water-stop portion runs along the vertical surface of the stepped portion, the rib is pressed into an inner side of the water-stop portion, and the water-stop portion is pushed against the vertical surface of the stepped portion and the rib.

6. The electronic device according to claim 5, wherein the second plate portion of the water-stop member has a spring property, and is caused to push the water-stop portion against the rib by a restorative force exerted by the second plate portion consequent to elastic deformation of the second plate portion, pushing the water-stop portion against the vertical surface of the stepped portion due to pressing of the rib into the inner side of the water-stop portion.

7. The electronic device according to claim 5, wherein the water-stop member is connected to a ground.

8. The electronic device according to claim 5, wherein the water-stop member comprises a protrusion extending toward the vertical surface of the stepped portion, a recess is disposed in the vertical surface of the stepped portion, and an end of the protrusion is inserted into the recess.

* * * * *